US011687806B2

(12) United States Patent
Pandit et al.

(10) Patent No.: US 11,687,806 B2
(45) Date of Patent: Jun. 27, 2023

(54) PROBLEM SOLVING USING SELECTED DATASETS OF INTERNET-OF-THINGS SYSTEM

(71) Applicant: INTERNATIONAL BUSINESS MACHINES CORPORATION, Armonk, NY (US)

(72) Inventors: Sushain Pandit, Austin, TX (US); Shikhar Kwatra, San Jose, CA (US); Sarbajit K. Rakshit, Kolkata (IN); Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 17/088,046

(22) Filed: Nov. 3, 2020

(65) Prior Publication Data

US 2022/0138597 A1    May 5, 2022

(51) Int. Cl.
*G06N 5/04* (2023.01)
*G16Y 40/20* (2020.01)
(Continued)

(52) U.S. Cl.
CPC ............... *G06N 5/04* (2013.01); *G06N 7/01* (2023.01); *G06N 20/00* (2019.01); *G16Y 40/20* (2020.01); *G16Y 40/30* (2020.01)

(58) Field of Classification Search
CPC .......... G06N 5/04; G06N 7/005; G06N 20/00; G16Y 40/20; G16Y 40/30
See application file for complete search history.

(56) References Cited

U.S. PATENT DOCUMENTS 9,563,854 B2    2/2017  Cruz Mota et al.
9,594,743 B2    3/2017  Bunin et al.
(Continued)

FOREIGN PATENT DOCUMENTS

WO    2017004240 A1    1/2017

OTHER PUBLICATIONS

Brownlee, Jason, "How to Identify Outliers in your Data," Machine Learning Mastery, Dec. 31, 2013, Retrieved on May 27, 2020, Retrieved from Internet: https://machinelearningmastery.com/how-to-identify-outliers-in-your-data/, 15 pages.
(Continued)

*Primary Examiner* — Gil H. Lee
*Assistant Examiner* — Chhian (Amy) Ling
(74) *Attorney, Agent, or Firm* — Caleb D. Wilkes

(57) ABSTRACT

A method, computer system, and a computer program product for problem solving using selected datasets from an internet-of-things system are provided. A trigger device in an internet-of-things system may be designated. The internet-of-things system may include the trigger device and internet-of-things devices. A trigger message may be received from the trigger device. A problem may be determined based on the trigger message. Data transmissions may be requested from the internet-of-things devices. Data may be received via the data transmission. The data transmission may be ended. A problem contributor may be identified by inputting the received data and the determined problem into a machine learning model. A problem response for responding to the problem may be generated. The generating may include inputting the problem contributor to the machine learning model. The problem response may be performed.

20 Claims, 6 Drawing Sheets

(51) Int. Cl.
*G16Y 40/30* (2020.01)
*G06N 20/00* (2019.01)
*G06N 7/01* (2023.01)

(56) References Cited

U.S. PATENT DOCUMENTS

| | | | |
|---|---|---|---|
| 9,867,023 B2 * | 1/2018 | Rauner | G08B 25/006 |
| 10,171,586 B2 | 1/2019 | Shaashau et al. | |
| 10,425,294 B2 * | 9/2019 | Vasseur | H04L 47/122 |
| 2006/0066445 A1 * | 3/2006 | Lo | G09F 25/00 |
| | | | 340/286.01 |
| 2015/0193695 A1 * | 7/2015 | Cruz Mota | G06N 3/08 |
| | | | 706/12 |
| 2016/0019043 A1 * | 1/2016 | Ramasamy | G06F 8/65 |
| | | | 717/171 |
| 2018/0089310 A1 * | 3/2018 | Barsness | G06F 16/3344 |
| 2018/0144100 A1 * | 5/2018 | Chalas | G16H 40/67 |
| 2018/0278887 A1 * | 9/2018 | Bostick | H04N 7/147 |
| 2019/0042618 A1 | 2/2019 | Potulska et al. | |
| 2019/0303569 A1 | 10/2019 | Cheng | |
| 2020/0020329 A1 | 1/2020 | Gordon et al. | |
| 2020/0042602 A1 * | 2/2020 | Anderson | G06F 40/56 |
| 2020/0193234 A1 * | 6/2020 | Pai | G06K 9/6262 |

OTHER PUBLICATIONS

Kolar et al., "Techniques for a Machine-Learning-Based Approach for Code-Context Enrichment for Industrial Internet of Things Systems," Cisco Systems, Inc., ip.com No. IPCOM000249408D, ip.com Publication Date Feb. 23, 2017, pp. 1-14.

Liu et al., "A crowdsourcing-based topic model for service matchmaking in Internet of Things", Future Generation Computer Systems, 87 (2018), pp. 186-197.

Mell et al., "The NIST Definition of Cloud Computing", National Institute of Standards and Technology, Special Publication 800-145, Sep. 2011, 7 pages.

Rendell et al., "Empirical Concept Learning as a Function of Data Sampling and Concept Character," ip.com No. IPCOM000151520D, ip.com Publication Date Apr. 22, 2007, pp. 1-45, original publication date Dec. 30, 1899.

* cited by examiner

US 11,687,806 B2

PROBLEM SOLVING USING SELECTED DATASETS OF INTERNET-OF-THINGS SYSTEM

BACKGROUND

The present invention relates generally to the field of artificial intelligence for Internet-of-Things devices.

SUMMARY

According to one exemplary embodiment, a method for problem solving using selected datasets from an internet-of-things system is provided. A trigger device in an internet-of-things system may be designated. The internet-of-things system may include the trigger device and internet-of-things devices. A trigger message may be received from the designated trigger device. A problem may be determined based on the received trigger message. Data transmissions may be requested from the internet-of-things devices. Data may be received via the data transmission. The data transmission may be ended. A problem contributor may be identified by inputting the received data and the determined problem into a machine learning model. A problem response for responding to the problem may be generated. The generating may include inputting the problem contributor to the machine learning model. The problem response may be performed. A computer system and computer program product corresponding to the above method are also disclosed herein.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
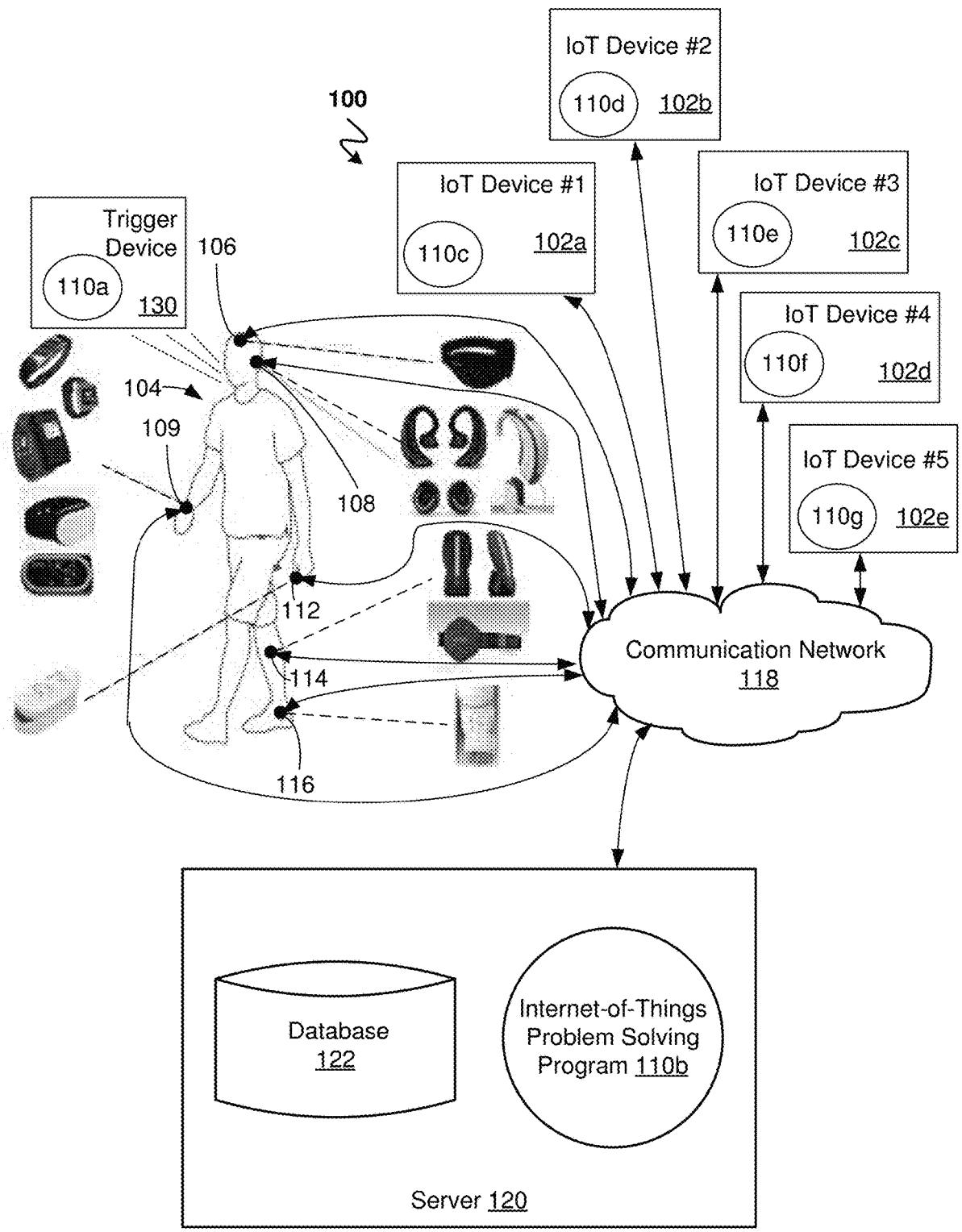
FIG. 1 illustrates a networked Internet-of-Things computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and computer program product for problem solving using selected datasets from an Internet-of-Things ecosystem. As such, the embodiments disclosed have the capacity to improve the technical field of artificial intelligence related to Internet-of-Things systems by reducing the data load typically generated by an Internet-of-Things ecosystem. In addition, the embodiments disclosed have the capacity to improve the technical field of artificial intelligence related to Internet-of-Things systems by reducing the computing power that is necessary to solve problems using data generated by an Internet-of-Things ecosystem.

Currently, huge sources of information/data sets are available for machine learning, and that includes data gathered from Internet-of-Things (IoT) sensor feeds inclusive of audio and/or camera feed and various devices These humongous amounts of data are captured on a continuous basis from different sources, mainly when the devices are in use.

The purpose of edge computing involves analysis of data near the source of data gathering points. Edge computing is a distributed computing paradigm that brings computation and data storage closer to the location where it is needed. Thus, edge computing helps improve response times and saves bandwidth. Even in an edge computing scenario, large amounts of data need to be analyzed. A problematic event in a system may not occur frequently. Due to this infrequent occurrence, to successfully investigate the problem it may be desirable to not perform analysis on all the gathered data. If entire sources/batches of data are to be considered during the training phase in the machine learning, it has been necessary to require large amounts of processing power, memory, computation timing, etc.

By improving artificial intelligence related to Internet-of-Things ecosystems, the described exemplary embodiments of methods, computer systems, and computer program products may use varied determinants to dynamically identify appropriate data set batches for investigating a problem. The identified data set batches need to be analyzed for effective machine learning computations. The exemplary embodiments help solve a big data problem that can occur when sparse data matrices are present due to a large number of regular data sets being recorded. If selected datasets can be gathered on an edge computing device at computed time intervals and based on visual/verbal cues and feedback from crowdsourced data, the computation of data sets and the models establishing the correlation among data entities would take lesser compute time.

Referring to FIG. 1, a networked Internet-of-Things computer environment 100 in accordance with one embodiment is depicted. The networked Internet-of-Things computer environment 100 may include a number of Internet-of-Things (IoT) devices, such as a first IoT device 102*a*, a second IoT device 102*b*, a third IoT device 102*c*, a fourth IoT device 102*d*, and a fifth IoT device 102*e*. Each of the IoT devices may include a processor and a data storage device that is enabled to run a software program and an Internet-of-Things Problem Solving program 110*c*, 110*d*, 110*e*, 110*f*, 110g, respectively. Each of the first IoT device 102a, second IoT device 102b, third IoT device 102c, fourth IoT device 102d, and fifth IoT device 102e may include a camera and/or a microphone.

IoT devices are physical objects that are embedded with sensors, software, or other technologies for the purpose of connecting and exchanging data with other devices and systems over the internet. IoT technology may include products pertaining to the concept of the smart home, including devices and appliances such as lighting fixtures, thermostats, home security systems and cameras, water systems, and other home appliances that support one or more common ecosystems, and that can be controlled via devices such as smartphone and smart speakers that are associated with that ecosystem. IoT devices are often configured with a vertical application where they share or receive data or information through the internet to or from an application designated or controlled by their manufacturer. In some embodiments, the IoT devices may be classified as non-essential devices.

In some embodiments the first IoT device 102a may be a microwave oven that includes one or more sensors, a processor, and a data storage device which allow the microwave oven to send information about its operation to the internet. The second IoT device 102b may be heating equipment, e.g., a furnace, that includes sensors, a processor, and a data storage device which allow the heating equipment to send information about its operation to the internet. The third IoT device 102c may be a washing machine that includes sensors, a processor, and a data storage device which allow the washing machine to send information about its operation to the internet. The fourth IoT device 102d may be a refrigerator that includes sensors, a processor, and a data storage device which allow the refrigerator to send information about its operation to the internet. The fifth IoT device 102e may be a lighting device that is part of a group of lighting devices. The lighting device may include sensors, a processor, and a data storage device which allow the lighting device to send information about its operation to the internet.

Figure 4:
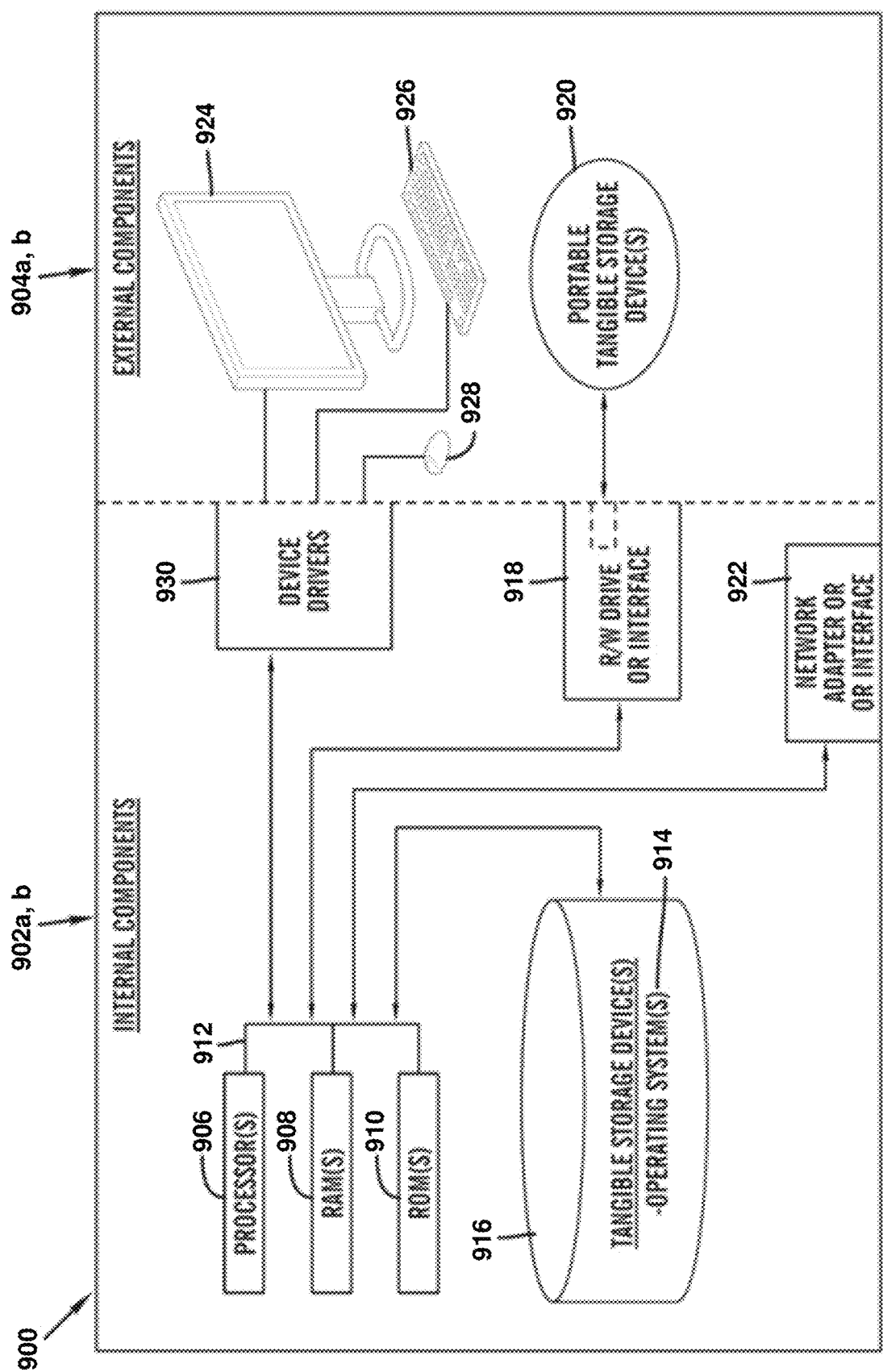
FIG. 4 is a block diagram of internal and external components of computers and servers depicted in FIG. 1 according to at least one embodiment.

The networked Internet-of-Things computer environment 100 may also include a trigger device 130. The trigger device 130 may be, for example, a mobile device, a telephone, a personal digital assistant, a netbook, a laptop computer, a tablet computer, a desktop computer, or another type of computing device capable of running a program, accessing a network, and accessing a database 122 in a server 120. The sensors of the trigger device 130 may include a microphone and/or a camera to allow the trigger device 130 to observe behavior of or receive a message from a user 104 who uses the trigger device 130 or is in the vicinity of the trigger device 130. The trigger device 130 may include internal components 902b and external components 904b, respectively, which are shown in FIG. 4 and which are subsequently described. The trigger device 130 may include a data storage device and an Internet-of-Things Problem Solving program 110a stored on the data storage device. The trigger device 130 may include a processor configured to actuate and help control the Internet-of-Things Problem Solving program 110a. In some embodiments, the trigger device 130 may constitute an edge computing device that is able to perform certain features of an edge computing device as described subsequently.

The trigger device 130 may be configured to begin speech recognition on spoken words of a user after the user speaks a wake word or phrase. The trigger device 130 may include programs to distinguish between voices of different individuals and to allow greater program access after recognizing the voice of a person designated as a main controller. In a household in which multiple individuals live, one of the individuals, e.g., user 104, may, for example, be considered a main controller of the trigger device 130 so that when the voice of this one individual is heard and recognized by the trigger device 130 the trigger device 130 becomes more accessible to perform operations as requested by the one individual. If the trigger device 130 hears a voice that it does not recognize, then the trigger device 130 may stay dormant or may block access to certain programs. In some settings, more than one individual could be designated by the trigger device 130 as a controller and the trigger device 130 may recognize the particular voice of each of the multiple individuals that are designated as controllers.

In some embodiments, a wearable electronic device that may gather physiological information from the user 104 may be designated as a suitable trigger device capable of sensing data that can trigger performance of the problem-solving program that uses Internet-of-Things devices.

The trigger device 130 and the first, second, third, fourth, and fifth IoT devices 102a, 102b, 102c, 102d, 102e may communicate with a communication network 118 which itself may include various types of communication networks, such as a wide area network (WAN), local area network (LAN), a telecommunication network, a wireless network, a public switched network and/or a satellite network. The communication network 118 may include connections, such as wire, wireless communication links, or fiber optic cables. It should be appreciated that FIG. 1 provides only an illustration of one implementation and does not imply any limitations with regard to the environments in which different embodiments may be implemented. Many modifications to the depicted environments may be made based on design and implementation requirements.

The networked Internet-of-Things computer environment 100 may also include a server 120 that includes a database 122 and that is enabled to run an Internet-of-Things Problem Solving program 110b. The Internet-of-Things Problem Solving program 110b may interact with the database 122 and with the communication network 118. The server 120 may in at least some embodiments be considered an edge computing device for the networked Internet-of-Things computer environment 100.

In some embodiments for example when the first, second, third, fourth, and fifth IoT devices 102a, 102b, 102c, 102d, 102e are disposed as being part of a smart home, the server 120 may be disposed in the smart home to allow for easier local control of the devices. The server 120 may constitute an edge computing device. The server 120 may include one or more programs that enable integration of information that is received from the various IoT devices that are located in the same smart home. In this embodiment, the server 120 may communicate with another server that is disposed remote from the smart home and that includes another Internet-of-Things Problem Solving program. Thus, the server 120 may communicate with the remote server to share machine learning with a controlling server for sharing with other local servers in other smart homes. The server 120 may communicate with the remote server to receive machine learning that is from a controlling server and that has been developed from servers in other smart homes.

Alternatively, the server 120 may be disposed at a location remote from such a smart home in which certain IoT devices are located and operating.

As will be discussed with reference to FIG. 4, the server 120 may include internal components 902a and external components 904a, respectively. The server 120 may also operate in a cloud computing service model, such as Software as a Service (SaaS), Platform as a Service (PaaS), or Infrastructure as a Service (IaaS). Server 120 may also be located in a cloud computing deployment model, such as a private cloud, community cloud, public cloud, or hybrid cloud.

The first, second, third, fourth, and fifth IoT devices 102a, 102b, 102c, 102d, 102e may include corresponding Internet-of-Things Problem Solving programs 110c, 110d, 110e, 110f, 110g, that may interact with data storage devices on the first, second, third, fourth, and fifth IoT devices 102a, 102b, 102c, 102d, 102e and that may interact with the communication network 118. The first, second, third, fourth, and fifth IoT devices 102a, 102b, 102c, 102d, 102e may use the corresponding Internet-of-Things Problem Solving programs 110c, 110d, 110e, 110f, 110g to share and receive data with the Internet-of-Things Problem Solving program 110b that is disposed on the server 120 and/or with the Internet-of-Things Problem Solving program 110a that is disposed on the trigger device 130.

The networked Internet-of-Things computer environment 100 may also include one or more additional cameras or microphones throughout the ecosystem that can communicate to the server 120 via the communication network 118.

The user 104 may also use wearable electronic devices that may gather physiological information from the user 104 or may gather other information from the vicinity of the user 104 and may connect to the communication network 118 to share or receive data therethrough. A first wearable electronic device 106 may include a headband with one or more sensors that gather physiological information or other information from a head region of the user 104. A second wearable electronic device 108 may include an earpiece with one or more sensors that gather physiological information or other information from an ear region of the user 104. A third wearable electronic device 109 may include a wrist device, such as a watch or a fitness strap, with one or more sensors that gather physiological information or other information from a wrist or hand region of the user 104. A fourth wearable electronic device 112 may include a finger clip with one or more sensors that gather physiological information or other information from a finger region of the user 104. A fifth wearable electronic device 114 may include a leg band with one or more sensors that gather physiological information or other information from a leg or calf region of the user 104. A sixth wearable electronic device 116 may include an ankle monitor with one or more sensors that gather physiological information or other information from an ankle or a foot region of the user 104.

According to various implementations of the present embodiment, the Internet-of-Things Problem Solving programs 110a, 110b, 110c, 110d, 110e, 110f, 110g may interact with a database 122 that may be embedded in various storage devices, such as, but not limited to a trigger device 130, a server 120, or a cloud storage service.

According to at least some embodiments of the present disclosure, a user 104 using a trigger device 130 or a server 120 may use the Internet-of-Things Problem Solving programs 110a, 110b to use data from the IoT devices, e.g., from the first, second, third, fourth, and fifth IoT devices 102a, 102b, 102c, 102d, 102e, to use selected datasets to detect an origin of a problem and perform a response to the problem. The method is explained in more detail below with respect to FIGS. 2 and 3.

In a normal operation, the first, second, third, fourth, and fifth IoT devices 102a, 102b, 102c, 102d, 102e, the trigger device 130, the first, second, third, fourth, fifth, and sixth wearable electronic devices 106, 108, 109, 112, 114, 116, and additional mobile phones, mobile electronic devices, cameras, or microphones in the vicinity may slam and overwhelm the server 120 with data if they send constant streams of data to the server 120. Most of the data gathered may be normal usage data, and often only a subset of the data will be relevant and statistically significant for helping identify a contributor to a problem within an Internet-of-Things ecosystem. The Internet-of-Things Problem Solving method, computer system, and computer program product as described herein may help identify those subsets of records that are relevant for problem solving and can be used in machine learning. Those subsets may be added as relevant and contextual data to an edge computing device, in order to more quickly and accurately produce a response to an identified problem. Those subsets may constitute relevant and contextual data and may be of a smaller amount than the total data streams that are capable of being sent to the edge computing device.

Figure 2:
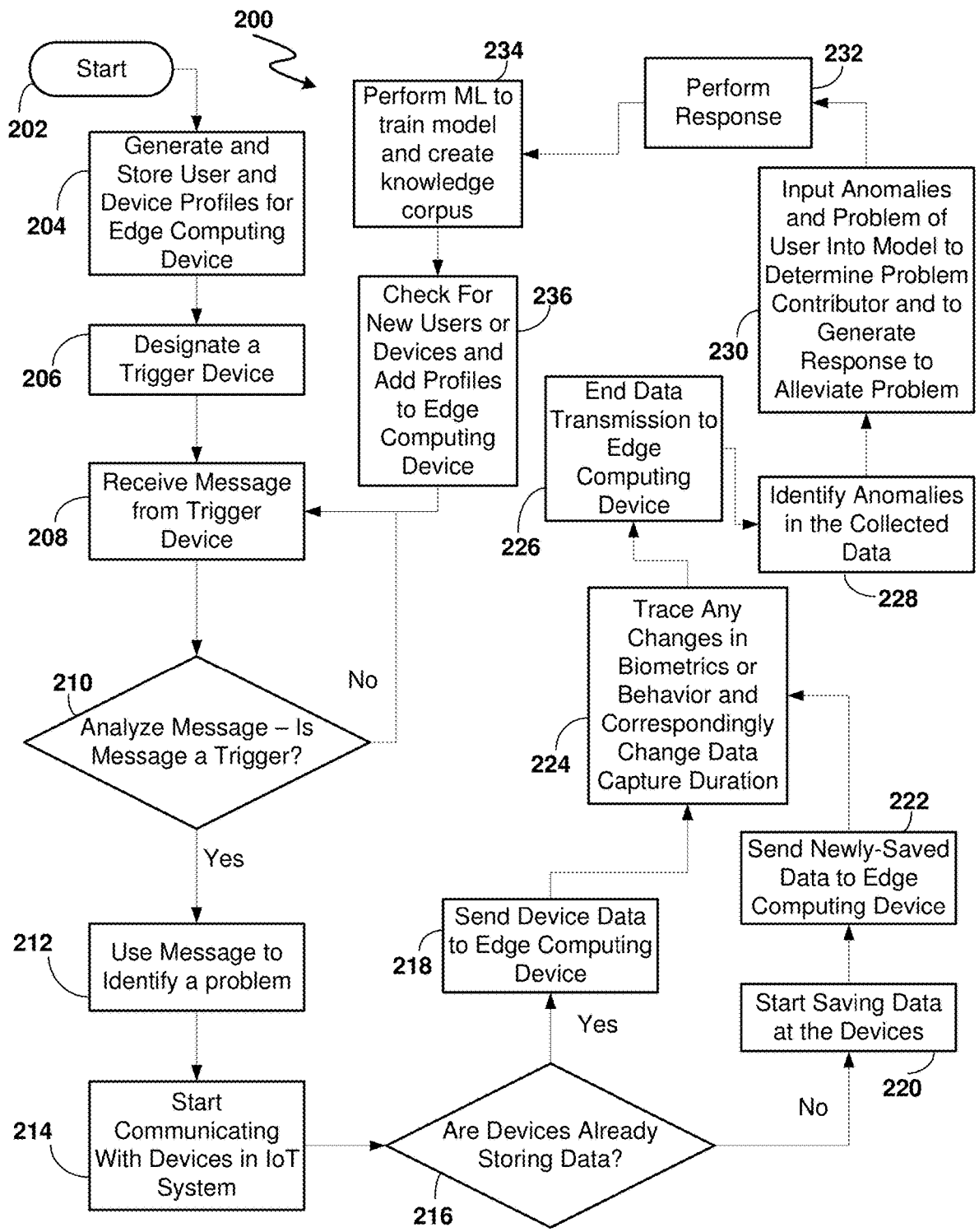
FIG. 2 is an operational flowchart illustrating a process for problem solving using reduced datasets of an Internet-of-Things system according to at least one embodiment.

Referring now to FIG. 2, an operational flowchart illustrating a process 200 used by the Internet-of-Things Problem Solving program 110a, 110b, 110c, 110d, 110e, 110f, 110g according to at least one embodiment is depicted. The process 200 includes steps from one or more embodiments according to the disclosure.

It may be appreciated that FIG. 2 provides only an illustration of one embodiment and does not imply any limitations with regard to how different embodiments may be implemented. Many modifications to the depicted embodiment(s) may be made based on design and implementation requirements.

As described in embodiments above, the Internet-of-Things Problem Solving program 110a, 110b, 110c, 110d, 110e, 110f, 110g may improve the functionality of a computer by reducing the data load typically generated by an Internet-of-Things system and to reduce the required computing power for problem solving using an Internet-of-Things ecosystem.

In step 202 of process 200 shown in FIG. 2, the process 200 is started.

In step 204 of process 200 shown in FIG. 2, device profiles and user profiles are generated and stored. These profiles may be generated and stored for an edge computing device. The server 120 shown in FIG. 1 may be an edge computing device. In an alternative embodiment, the trigger device 130 may constitute an edge computing device.

A profile for each IoT device, e.g., for each of the first, second, third, fourth, and fifth IoT devices 102a, 102b, 102c, 102d, 102e, may be generated and stored at the server 120. As part of this step, the server 120 may check for compatibility of IoT data that would be provided and perform integration of data and data types. The edge computing device may, thus, constitute an integration platform that is configured to perform communication integration and that may include one or more of a unified application programming interface (API), a unified software development kit (SDK), unifying protocol(s), and/or interoperability interfaces between different connected devices.

At the edge computing device, profiles may also be generated and stored for each of the first, second, third, fourth, fifth, and sixth wearable electronic devices 106, 108, 109, 112, 114, 116 and for any smart phone, smart speaker, camera, or microphone that is usually in an environment of a smart house at which the edge computing device is located or to which the edge computing device is assigned.

Profiles may also be generated and stored at the edge computing device that represent different individuals who are frequently present in the smart home, e.g., for an owner of the smart home, for members of the family who live at the smart home, and for friends of the owner who frequently visit the smart home. User consent may be requested by a web interface from the Internet-of-Things Problem Solving program 110a, 110b and obtained in order to obtain permission from the individuals for whom a profile is to be generated and stored.

As part of step 204, the edge computing device may search the vicinity to find any devices that are emitting a wireless signal. An owner of the smart home or operator of the edge computing device may be provided an opportunity via a web interface to manually inspect and confirm whether certain IoT devices indeed belong to the system of this particular smart home. The Internet-of-Things Problem Solving program 110a, 110b may have a web interface that is accessible via a device with an internet connection, so that a user of a computer may be prompted at the web interface to review and confirm whether any device generating a signal belongs to the smart home IoT system.

A user of a computer may in a similar manner, using a web interface, generate profiles for individuals who frequent the smart home. The profile may be matched with a voice, an appearance, linguistic characteristics, preferred gestures, biometric measurements, and/or physiological measurements of the respective individual. Each user profile may also be matched with a user-chosen IoT woke phrase or woke gesture which necessarily triggers operation of this Internet-of-Things Problem Solving program 110a, 110b. For example, for a profile for user 104 the IoT woke phrase "I-O-T help" may be saved in the profile as a trigger phrase based on the voice of the user 104. A gesture of two hands held flat in a raised position may be saved in the profile as a trigger gesture which necessarily triggers operation of this Internet-of-Things Problem Solving program 110a, 110b.

In step 206 of process 200 shown in FIG. 2, a trigger device from amongst the devices from the device profiles is designated. For example, the smart phone or smart speaker that constitutes the trigger device 130 shown in FIG. 1 may be designated at the edge computing device as the device for the system which receives trigger messages for the system. This trigger device 130 may have sensors such as a microphone or a camera that can sense or receive information from a user. The user 104 may be an owner of the smart home and may choose to designate his or her preferred smart phone or smart speaker as being the device that triggers the program. In some embodiments, the operator of the program may designate multiple devices as being approved to receive messages that may trigger operation of the program. For example, in a larger home with different smart speakers placed in various rooms, the operator may designate that each of these smart speakers may be a device that triggers the operation of the program. The device chosen as trigger device 130 may receive messages from a single user or may receive messages from multiple users. Thus, the device chosen to trigger may be associated with a single user profile or with multiple user profiles. Thus, based on operator choice the system may allow one individual only to give triggering messages or may allow multiple individuals to give triggering messages. In some embodiments, a wearable electronic device that may gather physiological information from a person such as the user 104 may be designated as a suitable trigger device.

By choosing selected devices and selected user profiles to be able to trigger operation of the program as opposed to any device in the system being able to trigger operation of the program, an amount of data evaluation may be reduced. Thus, in these initial stages after the profiles have been set up, the edge computing device does not need to receive any data transmission or data stream from most devices in the system, but rather initially receives a data transmission from just the one or more devices designated for triggering.

In step 208 of process 200 shown in FIG. 2, a message is received from the trigger device 130. The message may be an audio message, a video message, or a biometric message. The user may say into the trigger device 130, e.g., into a microphone of the trigger device 130, "There is a burning smell and an unusual noise coming from the kitchen", "It smells bad in here", or "It is too hot in here". The receiving of step 208 may consist of the trigger device 130 alone receiving the message or may include other devices such as the or another edge computing device, e.g., the server 120, receiving the message. The trigger device 130 may send the message via the communication network 118 to the edge computing device, e.g., to the server 120. If a wearable electronic device for gathering physiological data from a user has been designated as a suitable trigger device, then a biometric reading from the wearable electronic device may be sent to the edge computing device as a message for step 208. The wearable electronic device may include one or more of a headband, an earpiece, a wrist device such as a watch or a fitness strap, a finger clip, a leg band, and an ankle monitor as are shown in FIG. 1 and as described previously. The wearable electronic device may include a chest-worn heart monitor that includes a transmitter attached to a belt worn around the chest and a receiver worn on the wrist like a watch.

When the trigger device 130 includes a camera or a video camera, the message received for step 208 may be a video message that shows an unusual behaviour or unusual gesture by a user 104. For instance, the trigger device 130 may send pictures or videos of the user 104 searching for something in a different-than-usual place, e.g., inside a microwave oven, an electric box, or an oven, etc. The trigger device 130 may send to the edge computing device pictures or videos of facial expressions of the user 104 or of multiple users. The pictures may be of the user 104 altering a nose position, with the altering indicating that the user is smelling something.

In step 210 of process 200 shown in FIG. 2, the message is analyzed to determine whether the message is a trigger message for the Internet-of-Things Problem Solving program 110a, 110b. For this step 210, a machine learning model may be utilized which has been trained to recognize when messages are received that present an issue for which a search of the data of the IoT devices would be relevant or helpful. The message received in step 208 may be input into the machine learning model. This machine learning model may be stored at the edge computing device, e.g., at the server 120 or the trigger device 130, may be stored at the trigger device 130, or may be stored at a remote server that is accessible to the server 120 via network communications. The machine learning model may include one or more algorithmic tables to help perform this determination as to whether a message received is a trigger message. The machine learning model may include one or more machine learning algorithms. Messages indicating or showing aberrations or deviations from usual conditions may be considered as trigger messages. Historical data may be collected and processed in the machine learning model to help build the machine learning model. The historical data helping train the machine learning model helps the determination in step 210 to be carried out, as the historical data helps establish what constitutes usual behavior, usual verbal comments, and/or usual gestures or positioning for a user.

This machine learning model may use speech-to-text conversion, cognitive sound analysis, natural language processing (NLP), and/or text parsing to determine whether an audio message is a trigger message for step 210. These processes may flesh out key words or key phrases from the received message and perform analysis of the key words or of the key phrases. A new noise such as an animal noise, e.g., a dog barking, an unusually loud noise, a call for help, an alarm such as a fire alarm or a carbon monoxide alarm, an unusual machine noise due to a broken or defective part, a crashing sound, e.g., a sound of someone falling to the floor, and a pest noise, e.g., from a rodent or a bee, may be considered by the machine learning model as trigger messages.

For an embodiment when a wearable electronic device is a suitable trigger device, a biometric reading that indicates sweating by the user 104 or that indicates a high pulse rate of the user 104 may be considered as a trigger message. If a biometric reading changes at a high rate, e.g., at a rate that is higher than a threshold amount, the biometric reading may be considered a trigger message. Such a reading may indicate that the user 104 is experiencing discomfort or having a physical problem.

For an embodiment when a video message or picture message is sent and analyzed, an image analysis may be performed as part of step 210. The image analysis may determine whether the video message or picture message indicates that a user 104 is performing an unusual action, e.g., searching for an object in an unusual place, or performing an unusual gesture may be considered as trigger messages. Historical data may be collected and processed in the machine learning model to help build the machine learning model. The historical data helping train the machine learning model helps the determination in step 210 to be carried out, as the historical data helps establish what constitutes usual behavior and/or usual gestures or positioning for a user. A picture message or video message showing facial expressions indicating that the user 104 is experiencing discomfort or a physical problem may be interpreted to be a trigger message.

This machine learning model may be trained to distinguish trigger messages from routine messages given to the trigger device, such as "What time is it?", "Play acapella playlist", or "What is the weather forecast for today?" Feedback-based adjustment for certain messages may be updated and input into the machine learning model to avoid false triggers of the process 200. This machine learning model may evolve over time and may utilize feedback-based learning in order to better understand which behavioral changes, spoken content, etc. are to be excluded as triggers and are to be excluded from initiating the data capture from the IoT devices. For example, the machine learning model may be trained so that it can tune out noise and voices from a television program or movie that is playing. The machine learning model may be trained to exclude data capture between certain time windows, such as when a television program is regularly watched, or to exclude data capture when multiple persons are detected sitting nearby who seem to be in a similar user state. A user may watch a television series which causes them to make emotional outbursts when they watch, but the outbursts are in response to the context of the television series. The machine learning model may be trained to consider such outbursts made during the television series to not be a trigger message that triggers the IoT device data capture. The user 104 may provide explicit feedback and/or may set a preference in the Internet-of-Things Problem Solving program 110a to exclude IoT data capture during the watching of a particular television series.

If the analysis from step 210 provides a negative determination, then the process 200 returns to step 208 where another message from the trigger device 130 may be received. This step 210 and return to step 208 may help avoid data consumption overload by the edge computing device. This step helps the Internet-of-Things Problem Solving program 110a, 110b to avoid receiving data transmission from IoT devices when the program is not intended to be invoked, e.g., by the user 104.

If the analysis from step 210 provides an affirmative determination, then step 212 of process 200 shown in FIG. 2 is performed. In step 212, the message, which has been confirmed to be a trigger message, is used to identify a problem. This step 212 will invoke usage of a machine learning model and problem-classification taxonomies to help identify a problem. The trigger message may be input into a machine learning model. In step 212, the trigger message may be used to identify a problem as being one regarding temperature, smell, etc. This aspect of the machine learning model may use speech-to-text conversion, cognitive sound analysis, and text parsing to identify the problem that is presented via the trigger message. This identification may be considered a classification. The identification may also include a classification as to the urgency of solving the problem. Thus, if the determination is affirmative the process 200 proceeds towards initiating data capture from IoT devices, and the receiving of the trigger message constitutes an inflection point for the initiating of the data capture.

In step 214 of process 200 shown in FIG. 2, the edge computing device begins communicating with devices, e.g., IoT devices, in the IoT system. This communication may occur via the communication network 118. The edge computing device, e.g., the server 120 or the trigger device 130, may send a transmission to each of the IoT devices, e.g., to each of the first, second, third, fourth, and fifth IoT devices 102a, 102b, 102c, 102d, 102e. The communication of step 214 may include the edge computing device checking which IoT devices are transmitting a wireless stream. The edge computing device may send a message to every device for which a profile was generated and stored in step 204.

In step 216 of process 200 shown in FIG. 2, a query is made as to whether the devices of the IoT system are already storing data. This step 216 may include the edge computing device sending a polling transmission to one or more of the IoT devices, e.g., to one or more of the first, second, third, fourth, and fifth IoT devices 102a, 102b, 102c, 102d, 102e. This step 216 may also include the edge computing device sending a polling transmission to other devices in the system, e.g., to one or more of the first, second, third, fourth, fifth, and sixth wearable electronic devices 106, 108, 109, 112, 114, 116. The polling transmission may ask whether the respective device is currently storing data and has a data log or execution log for data that is being generated by a sensor of the respective device and is being generated through operation of the respective device.

Figure 3A:
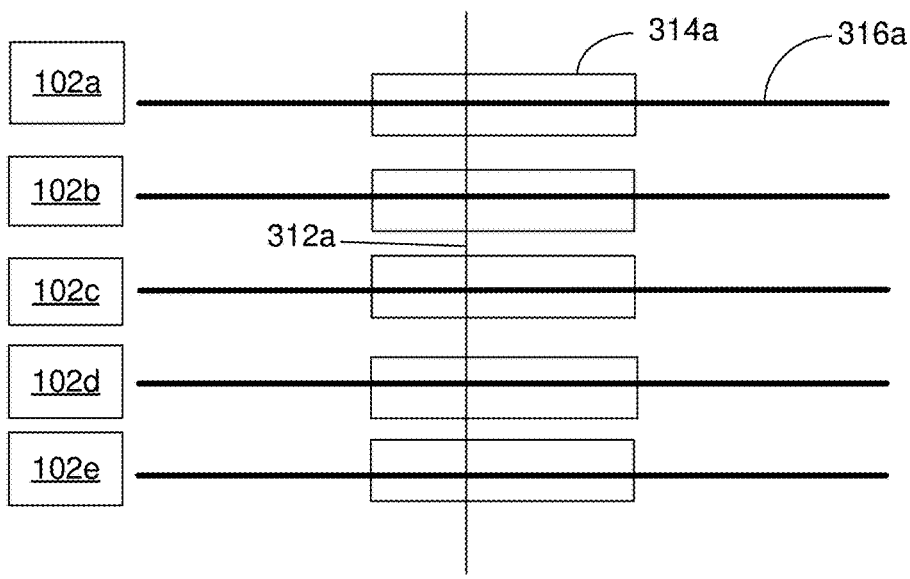
FIG. 3*a* is a block diagram illustrating an example of data capture according to at least one embodiment.

If the analysis from step 216 provides an affirmative determination, then the process 200 proceeds to step 218 in which the device data is sent to the edge computing device and the edge computing device receives device data. An initial polling transmission from the edge computing device to the other devices may include a command to transmit data device on the condition that the query of step 216 is positive. FIG. 3A shows an example of data transmission from the first, second, third, fourth, and fifth IoT devices 102a, 102b, 102c, 102d, 102e when the query from step 216 provides an affirmative determination that the devices were already saving data. The execution log 316a indicates that the devices were already saving data. FIG. 3A shows a time chronology where the x-axis represents time. First trigger message reception time 312a indicates when the trigger message was received.

FIG. 3A shows that the first data capture 314a represented by a square includes data saved from before the first trigger message reception time 312a (e.g., to the left of the vertical line representing the first trigger message reception time 312a) as well as some data saved after the first trigger message reception time 312a (e.g., to the right of the of the vertical line representing the first trigger message reception time 312a).

Figure 3B:
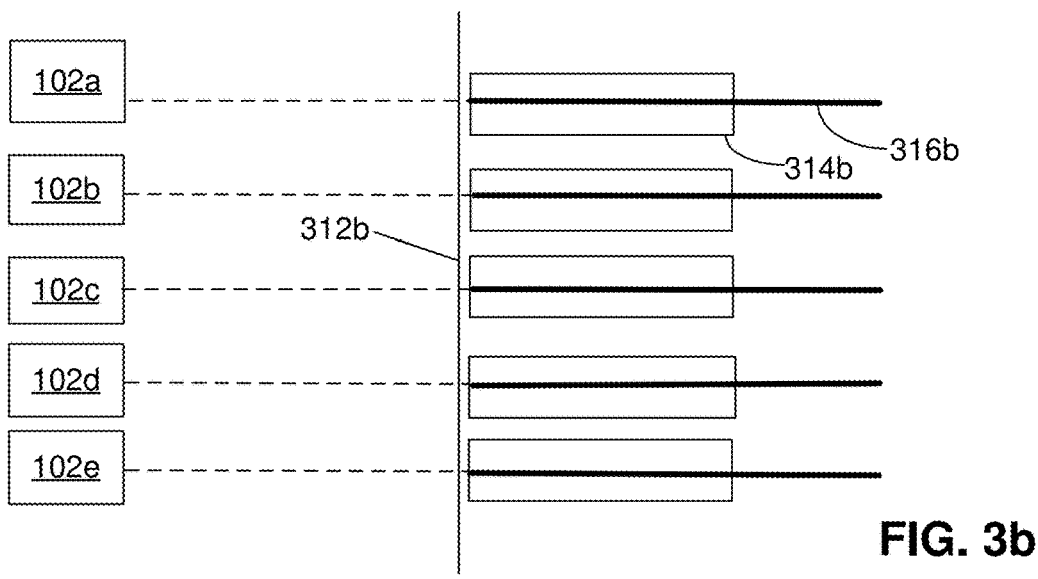
FIG. 3*b* is a block diagram illustrating another example of data capture according to at least one embodiment.
Figure 3C:
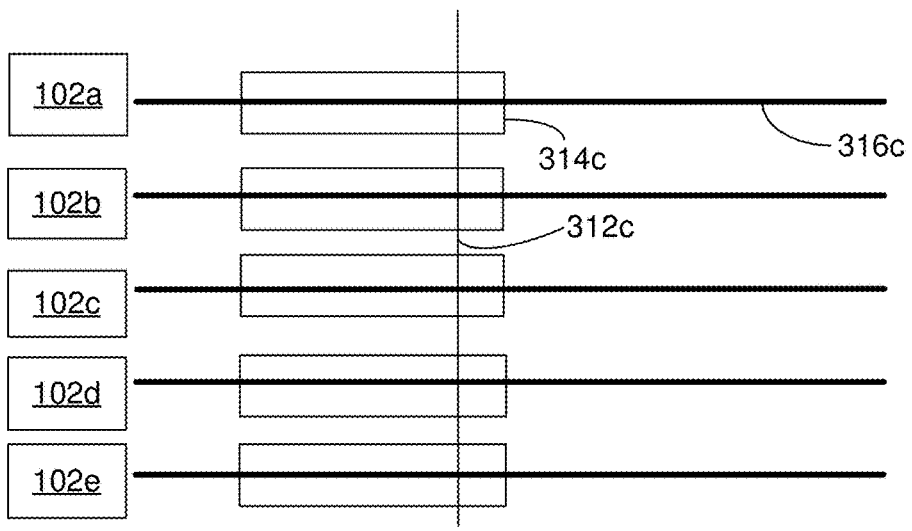
FIG. 3*c* is a block diagram illustrating a further example of data capture according to at least one embodiment.

FIG. 3C shows another type of data transmission for step 218 which in some instances may send data more quickly back to the edge computing device. The execution log 316c indicates that the devices were already saving data. FIG. 3C shows that the third data capture 314c represented by a square includes more data saved from before the third trigger message reception time 312c (e.g., to the left of the vertical line representing the third trigger message reception time 312c) than data saved after the third trigger message reception time 312c (e.g., to the right of the of the vertical line representing the third trigger message reception time 312c). With this embodiment, the final data transmission package can be sent more quickly or at an earlier time back to the edge computing device as compared to the transmission in FIG. 3A.

If the analysis from step 216 provides a negative determination, then the process 200 proceeds to step 220 in which the edge control device commands the devices, e.g., the IoT devices such as the first, second, third, fourth, and fifth IoT devices 102a, 102b, 102c, 102d, 102e, to begin saving data. An initial polling transmission from the edge computing device to the other devices may include this command that is invoked on the condition that the query of step 216 is negative.

Along this branch of the process 200, in step 222 the newly saved data is sent to the edge computing device. FIG. 3B shows an embodiment according to step 222 with a second data capture 314b represented by a square that includes data saved from after the second trigger message reception time 312b (e.g., to the right of the of the vertical line representing the second trigger message reception time 312b) and no data from before the second trigger message reception time 312b (e.g., to the left of the vertical line representing the second trigger message reception time 312b). Because the devices were not saving data before the second trigger message reception time 312b, there was no device data from before the second trigger message reception time 312b for the device to send to the edge computing device. The execution log 316b indicates that the devices started saving data after being commanded to by the edge computing device after the edge computing device received a trigger message at the second trigger message reception time 312b. The dotted lines in the x-direction and to the left of the second trigger message reception time 312b in FIG. 3B indicate that the devices were not saving data locally at that time.

In step 224, both branches here, namely step 218 or step 220/step 222, of process 200 merge and any changes in biometrics or behavior are traced and data capture duration is correspondingly changed. Tracing changes in biometrics may include the edge computing device receiving data from biometric devices such as one or more of the first, second, third, fourth, fifth, and sixth wearable electronic devices 106, 108, 109, 112, 114, 116.

Once the edge computing device begins receiving data from the devices of or within the IoT ecosystem, the edge computing device may check the data to analyze behavior and/or biometrics of the user 104 or of multiple users to check for unusual behavior and/or unusual biometrics. If the behavior of the user is found to be different relative to what would be a normal situation for that user, then the machine learning may instruct the edge computing device to continue the data capture or to increase the duration of the data capture from the IoT and other devices. Changes in biometrics or in user behaviour may be input into the machine learning model. For instance, if the data shows that the user 104 is searching for something in a different-than-usual place, e.g., inside a microwave oven, an electric box, or an oven, etc., the edge computing machine may instruct those devices to continue to send their data until the unusual behavior of the user 104 ceases.

The data from the various devices may also include information about facial expressions of the user 104 or of multiple users. For example, cameras within the IoT ecosystem may send data to the edge computing device about the facial expression of the user 104 or of other users. For instance, the tracking of the facial information may indicate that the user is smelling something. Biometric data that is received may indicate unusual levels of sweating, pulse rate, etc. which may indicate that the problem is ongoing. Based on these additional data evaluations, the edge computing device may cause data capture from the IoT devices or from other devices within the IoT ecosystem to continue or may cause the duration of the data capture from the IoT and other devices to increase. Based on the problem identified in step 212, the edge computing device may also request data from specific devices within the IoT ecosystem, e.g., within the smart home. These additional data may be used in the machine learning to help train the machine learning model for future problem solving.

The duration of data capture from different IoT devices and from other devices within the IoT ecosystem may be dynamically adjusted, e.g., by the edge computing device, based on the behavior and/or reaction of the user 104, whether anomalous behavior continues, and whether an extended duration of data capture would be helpful for machine learning of a sub-system for use in a further training process. If a user 104 continues to exhibit varying or anomalous behavior, the machine learning model in the edge computing device may cause the data capture to continue for the duration of the varying or anomalous behavior. This continued capture of data and tracking of unusual behaviour may include receiving continued audio messages from the user 104 via a smart speaker or a smart phone such as the trigger device 130 or may include receiving continued videos from a camera who is filming the user 104 or is filming other individuals in the smart home. Artificial intelligence and a machine learning model may be used by the edge computing device to determine whether user behaviour or user biometrics is/are anomalous or include/includes outliers.

In step 226 of process 200 shown in FIG. 2, the data transmission, from the devices of the IoT ecosystem to the edge computing device, stops. This ceasing of data transmission helps the amount of data that has to be examined to be reduced. Thus, the data to be analyzed and investigated may be on a selected subset of overall possible data that could be or has been generated by the IoT system. This reduction helps reduce the data load that can overall be generated by an Internet-of-Things system. This cessation of data transmission helps reduce the required computing power for problem solving using the Internet-of-Things ecosystem. The cessation of transmitting the data may occur with the edge computing device sending a data transmission stopping signal to all devices of the IoT ecosystem.

In step 228 of process 200 shown in FIG. 2, anomalies in the collected data are identified. The collected data may be input into the machine learning model. Unsupervised machine learning may be performed on the data received by the edge computing device to identify the anomalies. The step 228 may include looking for previously undetected patterns in a data set with no pre-existing labels and with a minimum of human supervision. Self-organization that allows for modeling of probability densities over inputs may be used.

The anomalies may alternatively be identified by supervised learning, reinforcement learning, or semi-supervised learning. Supervised learning may include a function that maps an input to an output based on example input-output pairs. The supervised learning infers a function from labeled training data consisting of a set of training examples. This supervised learning may be applied to historical user behavior and speech data. Labels may be provided by the user 104. Reinforcement learning may include a Markov decision process or a partially observable Markov decision process. For reinforcement learning, an algorithm may receive feedback from data analysis, guiding to the best outcome. Reinforcement learning may include learning through trial and error. Semi-supervised learning may include working with a mixture of some labeled data and some unlabeled data. Deep learning may also be implemented for the machine learning model and may include incorporation of neural networks in successive layers to learn from data in an iterative manner.

The step 228 may include principal component and cluster analysis. Cluster analysis may be used to group, or segment, datasets with shared attributes in order to extrapolate algorithmic relationships. Cluster analysis may include grouping data that has not been labelled, classified or categorized. Instead of responding to feedback, cluster analysis may identify commonalities in the data and may react based on the presence or absence of such commonalities in each new piece of data in order to help detect anomalous data points that do not fit into either group. As part of step 228, the collected data may be correlated with the problem of the user 104. The data output from the IoT devices may be analyzed as part of the step 228.

These various types of machine learning used in step 228 may also be used in one or more of step 210, step 212, step 224, and step 230.

In step 230 of process 200 shown in FIG. 2, the anomalies and the problem of the user are input into a machine learning model to determine a problem contributor and to generate a response to alleviate the problem. The machine learning model may be trained to analyze and interpret device data such as anomalous device data to recognize devices or actors that are contributing to the problem that was pointed to in the trigger message. For example, the device data may be analyzed by the machine learning model to connect an increase in temperature with a defective oven or a defective thermostat. The device data may be analyzed by the machine learning model to connect an unusual smell with a defective oven or a defective refrigerator. Thus, the defective oven or the defective refrigerator may be designated as a problem contributor or a contributor to the problem. The problem contributor may in some instances be the sole originator of the problem and in other instances be one of multiple contributors to the problem. The device data may be analyzed by the machine learning model to connect a new unpleasant noise with a broken oven, a broken refrigerator, a broken smoke alarm, etc. Thus, the broken oven, the broken refrigerator, or the broken smoke alarm may be designated as a problem contributor or a contributor to the problem. The device data including camera data may be analyzed by the machine learning model to connect a crashing sound with a person or object having fallen in another room. Thus, the fallen individual or fallen object may be designated as a problem contributor or a contributor to the problem. Many other problem contributors may be determined. As part of step 230, the collected data may be correlated with the problem of the user 104.

The machine learning model may be trained to generate a possible response to the problem that may help alleviate or resolve the problem. For example, the machine learning model may determine that an appropriate response to an increase in temperature and a defective oven or a defective thermostat is to turn off the oven or the thermostat or to replace a sub-component of the oven or thermostat. The machine learning model may determine that an appropriate response to an unusual smell with a defective oven or a defective refrigerator is to turn off the oven or to clean the oven or refrigerator. The machine learning model may determine that an appropriate response to a condition of a person or object having fallen is to go to the location of the person or object and in some instances to call medical emergency personnel or a cleanup service.

In step 232 of process 200 shown in FIG. 2, the response that was generated in step 230 is performed. This response may include a presentation to the user 104 of a recommendation for alleviating the problem, so that the user 104 may then need to perform some action to help alleviate the response. Step 232 may also or alternatively include the edge computing device causing the IoT system or a device in the IoT system to perform the response.

If the generated response includes the presentation of a recommendation to the user 104, the edge computing device may present the recommendation by displaying the recommendation on a screen of the trigger device 130 or on another screen within the IoT ecosystem. The edge computing device may provide the recommendation by playing the recommendation as an audio message from the trigger device 130 or from another speaker in the IoT ecosystem. In some embodiments, the response may be to query the user 104 for more information by presenting a question to the user 104. Such question may also be presented to the user 104 via one or more of the above-mentioned screens or may be provided in audio form via one or more of the above-mentioned speakers. The user 104 would then be provided an opportunity to respond to the question via typing or speaking and the edge computing device may then process the response of the user 104 to provide an enhanced response.

One response may be to control an operation of one or more of the devices within the IoT ecosystem. For example, this controlling may include turning off one of the IoT devices. For that response, the edge computing device may send a signal to that IoT device such that when the IoT device receives the signal the IoT device shuts itself off. For example, if the first IoT device 102a is an oven the edge computing device, e.g., the server 120, may send a signal to the first IoT device 102a which causes the first IoT device 102a to turn itself off.

The response may also include the sending of a communication to another device. Such communication may be a phone call, an email, a text message, etc. Such a communication may be a notification to external sources to request help, e.g. a 911 call.

In step 234 of process 200 shown in FIG. 2, machine learning is performed to train the machine learning model and to create a knowledge corpus. The problem contributor, anomalies, problem, and the message of the user that are received, matched, identified, or determined in the previous steps of the method may now be added into the machine learning model to help train this machine learning model for future problem solving. The datasets and relevant data combinations in the machine learning model may constitute a knowledge corpus that is part of the basis for the machine learning model. The matches and connections made in this iteration of the process 200 may be used by the machine learning model to reinforce existing algorithmic leanings or to add new opportunities into the machine learning model. A user 104 may be given the opportunity via a web interface to manually review and confirm the effectiveness and/or accuracy of the trigger message determination, the problem identification, the determination of the problem contributor, and the problem-alleviating response that were generated by the machine learning model in this iteration. As part of step 234, the collected data may be correlated with the problem. Pearson correlation of the problem and the selected IoT data subset may be used to create the knowledge corpus.

As part of step 234, the edge computing device, e.g., the server 120, may communicate with a remote server to share machine learning with a controlling server, so that the controlling server may share the new machine learning correlations with other local servers in other smart homes. Alternatively, the edge computing device may communicate with a remote server to receive machine learning that is from a controlling server and that has been developed from edge computing devices in other smart homes. Thus, in some embodiments an external server may house and store a controlling version of the machine learning model in addition to the edge computing device storing a version of the machine learning model.

In step 236 of process 200 shown in FIG. 2, a check for new users or device is made, and profiles for any new users or new devices are added to the edge computing device. This step 236 may be performed by repeating the techniques used in step 204. As part of step 236, a user 104 may be prompted via a web interface and asked whether any additional individuals are newly frequenting the smart home and whether any new profile should be added for such new individuals.

The cycle can be repeated starting from step 208 so that the additional problems can be investigated and solved and so that the model can be additionally trained. The knowledge corpus can be repeatedly improved and trained with new information.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Trigger device 130 and server 120 may include respective sets of internal components 902a, 902b and external components 904a, 904b illustrated in FIG. 4. Each of the sets of internal components 902a, 902b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the Internet-of-Things Problem Solving program 110a in trigger device 130, and the Internet-of-Things Problem Solving program 110b in server 120, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, 902b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the Internet-of-Things Problem Solving program 110a and 110b can be stored on one or more of the respective portable computer-readable tangible storage devices 920, read via the respective R/W drive or interface 918 and loaded into the tangible storage device 916 of the respective hard drive.

Each set of internal components 902a, 902b may also include network adapters (or switch port cards) or interfaces 922 such as a TCP/IP adapter cards, wireless wi-fi interface cards, or 3G or 4G wireless interface cards or other wired or wireless communication links. The Internet-of-Things Problem Solving program 110a in trigger device 130 and the Internet-of-Things Problem Solving program 110b in server 120 can be downloaded from an external computer (e.g., server) via a network (for example, the Internet, a local area network or other, wide area network) and respective network adapters or interfaces 922. From the network adapters (or switch port adaptors) or interfaces 922, the Internet-of-Things Problem Solving program 110a in trigger device 130 and the Internet-of-Things Problem Solving program 110b in server 120 are loaded into the tangible storage device 916 of the respective hard drive. The network may include copper wires, optical fibers, wireless transmission, routers, firewalls, switches, gateway computers and/or edge servers.

Each of the sets of external components 904a, 904b can include a computer display monitor 924, a keyboard 926, and a computer mouse 928. External components 904a, 904b can also include touch screens, virtual keyboards, touch pads, pointing devices, and other human interface devices. Each of the sets of internal components 902a, 902b also includes device drivers 930 to interface to computer display monitor 924, keyboard 926 and computer mouse 928. The device drivers 930, R/W drive or interface 918 and network adapter or interface 922 include hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
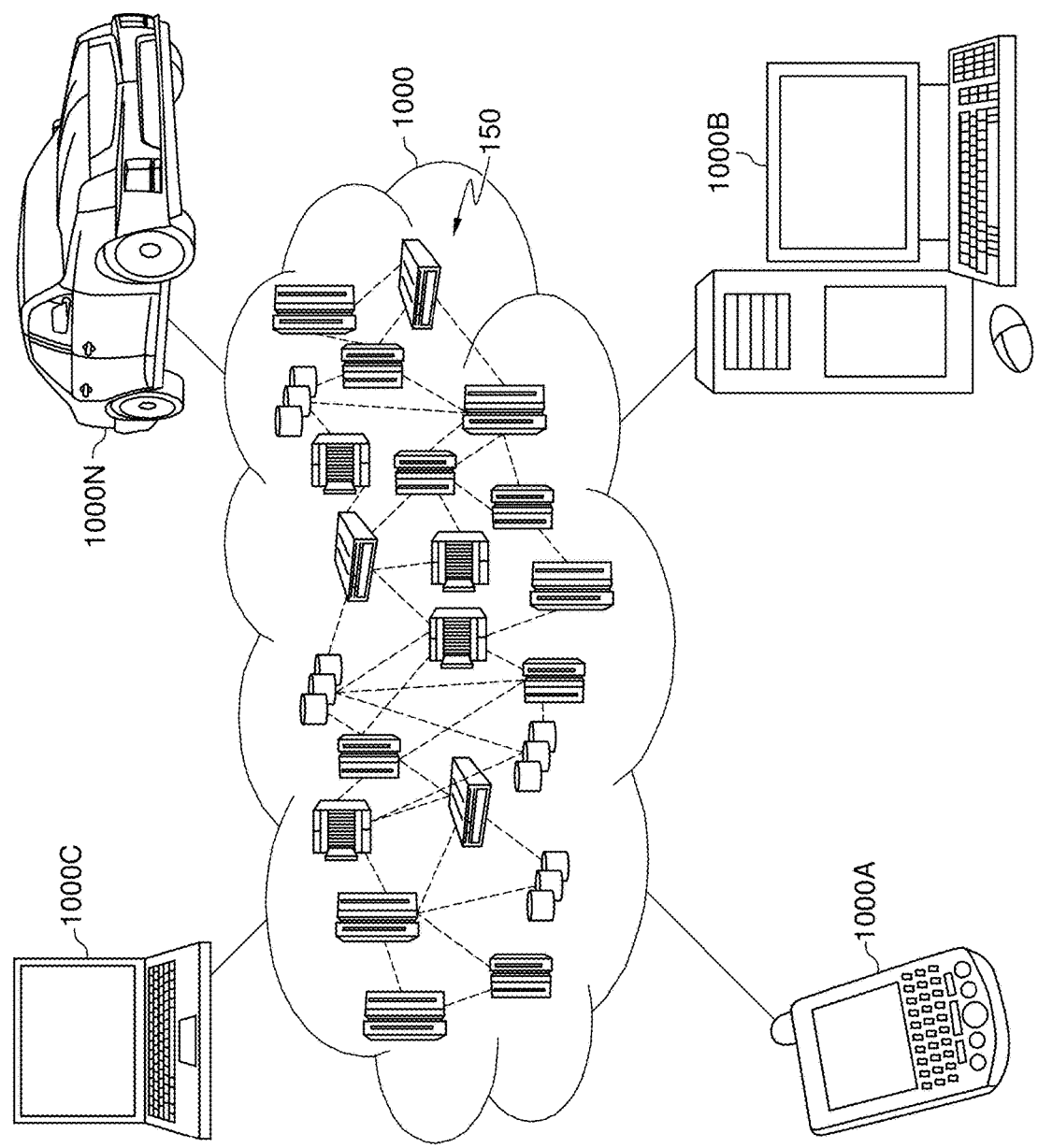
FIG. 5 is a block diagram of an illustrative cloud computing environment including the networked Internet-of-Things computer environment depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 150 with which local computing devices used by cloud consumers, such as, for example, personal digital assistant (PDA) or cellular telephone 1000A, desktop computer 10006, laptop computer 1000C, and/or automobile computer system 1000N may communicate. Nodes 150 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 150 and cloud computing environment 1000 can communicate with any type of computerized device over any type of network and/or network addressable connection (e.g., using a web browser). The cloud computing nodes 150 may include various components of the networked Internet-of-Things computer environment 100 shown in FIG. 1.

Figure 6:
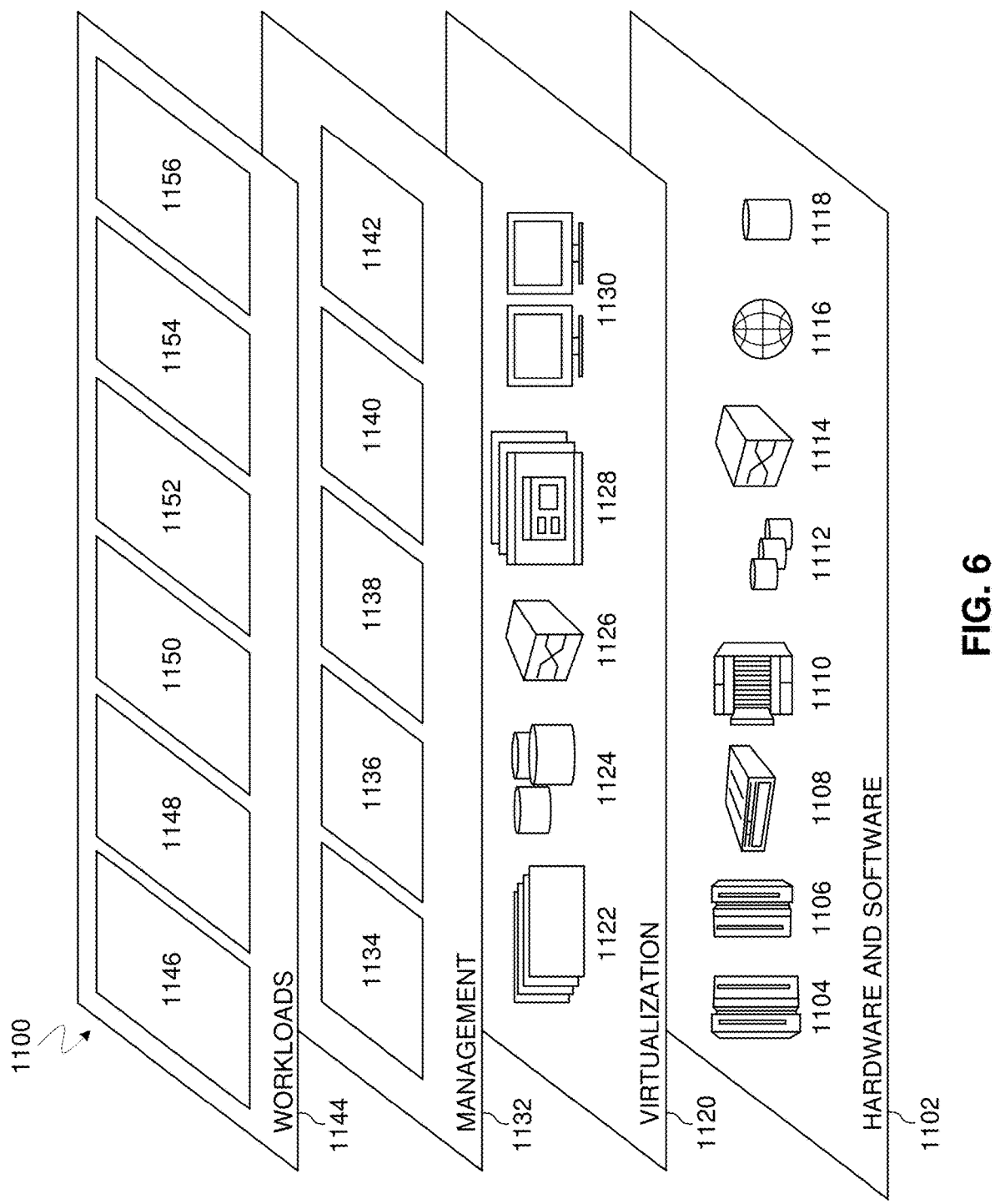
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and Internet-of-Things problem solving 1156. An Internet-of-Things Problem Solving program 110a, 110b, 110c, 110d, 110e, 110f, 110g provides a way to use selective datasets from an IoT ecosystem to investigate a problem in the ecosystem and to provide a response for solving or alleviating the problem.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   designating, via one or more processors, a trigger device in an internet-of-things system, the internet-of-things system comprising the trigger device and internet-of-things devices;
   collecting and processing historical data to build and update a first machine learning model for analyzing received messages;
   receiving, via the one or more processors, a first message from the designated trigger device, the first message comprising a word message received from a user of the trigger device;
   determining whether the received first message qualifies as a trigger message by submitting the received first message to the first machine learning model and receiving an output from the first machine learning model, the output indicating that the received first message qualifies as the trigger message in response to a determination that the received first message comprises an aberration from usual conditions based on the historical data;
   in response to determining that the received first message qualifies as the trigger message:
      determining, via the one or more processors, a problem based on the received trigger message;
      determining, via the one or more processors, whether selected household devices of the internet-of-things devices are saving respective individual device execution logs after the trigger message is received, the selected household devices being selected based on the determined problem;
      requesting, via the one or more processors, data transmissions from the selected household devices;
      receiving, via the one or more processors, data from the selected household devices via the data transmissions;
      ending, via the one or more processors, the data transmissions;
      identifying, via the one or more processors, a problem contributor by inputting the received data and the determined problem into a second machine learning model;
      generating, via the one more processors, a problem response for responding to the problem, wherein the generating the problem response comprises inputting the identified problem contributor into the second machine learning model; and
      performing, via the one or more processors, the generated problem response, wherein the problem response comprises adjusting at least one of the selected household devices of the internet-of-things devices.

2. The method of claim 1, further comprising identifying one or more anomalies in the received data.

3. The method of claim 1, further comprising inputting the identified problem contributor, the generated problem response, the determined problem, the received trigger message, and the received data to the second machine learning model to train the second machine learning model.

4. The method of claim 1, further comprising:
   in response to determining that the selected household devices are not saving respective individual device execution logs, sending, via the one or more processors, a command to the selected household devices to start generating respective individual device execution logs.

5. The method of claim 1, wherein the method further comprises:
tracing biometrics or behavior of the user of the trigger device; and
changing a duration of data capture for the data transmissions based on detecting a change in the biometrics or the behavior.

6. The method of claim 1, further comprising performing supervised training of the first machine learning model by a user labeling speech data.

7. The method of claim 1, further comprising training the first machine learning model to ignore sounds generated from a television.

8. The method of claim 1, wherein the performing generated problem response comprises transmitting a function operation change message to the at least one of the selected household devices.

9. The method of claim 8, wherein the function operation change message causes the at least one selected household device to shut off.

10. The method of claim 1, wherein the word message comprises a voice message, the one or more processors perform speech-to-text recognition on the received voice message to produce text, and natural language processing is performed on the text.

11. The method of claim 1, wherein the second machine learning model further provides a classification of urgency of solving the determined problem.

12. The method of claim 1, wherein the selected household devices are from a group consisting of: an oven, a heater, a washing machine, a refrigerator, a light, a thermostat, and an alarm.

13. A computer system for problem solving using selected datasets from an internet-of-things system, the computer system comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
designating a trigger device in an internet-of-things system, the internet-of-things system comprising the trigger device and internet-of-things devices;
collecting and processing historical data to build and update a first machine learning model for analyzing received messages;
receiving a first message from the designated trigger device, the first message comprising a word message received from a user of the trigger device;
determining whether the received first message qualifies as a trigger message by submitting the received first message to the first machine learning model and receiving an output from the first machine learning model, the output indicating that the received first message qualifies as the trigger message in response to a determination that the received first message comprises an aberration from usual conditions based on the historical data;
in response to determining that the received first message qualifies as the trigger message:
determining a problem based on the received trigger message;
determining whether selected household devices of the internet-of-things devices are saving respective individual device execution logs after the trigger message is received, the selected household devices being selected based on the determined problem;
requesting data transmissions from the selected household devices;
receiving data from the selected household devices via the data transmissions;
ending the data transmissions;
identifying a problem contributor by inputting the received data and the determined problem into a second machine learning model;
generating a problem response for responding to the problem, wherein the generating the problem response comprises inputting the identified problem contributor to the second machine learning model; and
performing the generated problem response, wherein the problem response comprises adjusting at least one of the selected household devices of the internet-of-things devices.

14. The computer system of claim 13, wherein the method further comprises:
in response to determining that the selected household devices of the internet-of-things devices are not saving individual device execution logs, sending a command to the selected household devices to start generating respective individual device execution logs.

15. The computer system of claim 13, wherein the method further comprises:
tracing biometrics or behavior of the user of the trigger device; and
changing a duration of data capture for the data transmissions based on detecting a change in the biometrics or the behavior.

16. The computer system of claim 13, wherein the performing the generated problem response comprises transmitting a function operation change message to the at least one of the selected household devices.

17. The computer system of claim 16, wherein the function operation change message causes the at least one selected household device to shut off.

18. A computer program product for problem solving using selected datasets from an internet-of-things system, wherein the computer program product comprises a computer-readable storage medium having program instructions embodied therewith, wherein the program instructions are executable by a processor to cause the processor to perform a method comprising:
designating a trigger device in an internet-of-things system, the internet-of-things system comprising the trigger device and internet-of-things devices;
collecting and processing historical data to build and update a first machine learning model for analyzing received messages;
receiving a first message from the designated trigger device, the first message comprising a word message received from a user of the trigger device;
determining whether the received first message qualifies as a trigger message by submitting the received first message to the first machine learning model and receiving an output from the first machine learning model, the output indicating that the received first message qualifies as the trigger message in response to a determination that the received first message comprises an aberration from usual conditions based on the historical data;

in response to determining that the received first message qualifies as the trigger message:
- determining a problem based on the received trigger message;
- determining whether selected household devices of the internet-of-things devices are saving respective individual device execution logs after the trigger message is received, the selected household devices being selected based on the determined problem;
- requesting data transmissions from the selected household devices;
- receiving data from the selected household devices via the data transmissions;
- ending the data transmissions;
- identifying a problem contributor by inputting the received data and the determined problem into a second machine learning model;
- generating a problem response for responding to the problem, wherein the generating the problem response comprises inputting the identified problem contributor to the second machine learning model; and
- performing the problem response, wherein the problem response comprises adjusting at least one of the selected household devices of the internet-of-things devices.

19. The computer program product of claim 18, wherein the method further comprises identifying one or more anomalies in the received data.

20. The computer program product of claim 18, wherein the method further comprises inputting the identified problem contributor, the generated problem response, the determined problem, the received trigger message, and the received data to the second machine learning model to train the second machine learning model.

* * * * *